Patented Nov. 15, 1949

2,488,248

UNITED STATES PATENT OFFICE 2,488,248

SEED CULTURES OF FILAMENTOUS ORGANISMS

Milton J. Vander Brook and George M. Savage, Kalamazoo, Mich., assignors to The Upjohn Company, Kalamazoo, Mich., a corporation of Michigan No Drawing. Application December 13, 1944, Serial No. 568,062

1 Claim. (Cl. 195—77)

This invention relates to the production of seed units useful in the culturing of filamentous organisms and particularly of penicillin-producing organisms.

In the culturing or growing of microorganisms on a commercial scale for the production of penicillin or of other substances formed by the organisms during its growth, it is common practice in the art first to prepare a so-called "seed culture" by growing the organism in a relatively small volume of medium and then to use the seed culture to inoculate a much larger volume of medium for the actual production of the substance desired. This procedure, which is so well known in the art as to require no discussion here, favors a larger number of growth centers in the production unit, a higher utilization of the medium, a greater production per unit of equipment, and a more uniform stage of development of the organism at all points throughout the medium. These conditions are often necessary to the success of the process. In many instances, it is necessary, in order to realize one or more of them to the fullest extent, to culture the organism not only once prior to seeding the commercial unit, but two or more times on an increasingly large scale, each culture being seeded with the one preceding it until, finally, sufficient organism is produced to seed the commercial unit properly. Such a procedure is time consuming and requires elaborate and expensive equipment which must be sterilized regularly. It is known, furthermore, that the vitality and power of the organism to produce the desired chemical compound is often interfered with seriously by re-culturing it several times in this manner.

Although the above-described seeding procedure is in common use in the growing in liquid media of those organisms which divide regularly under normal conditions of growth into small independent and separate units which grow freely in the medium, a further difficulty in this mode of procedure is encountered when it is attempted to produce a seed culture of an organism of the type usually referred to as "filamentous organisms" which are characterized by their tendency to form a soft ball of long, intertwined and branching filaments around each seed or growth center from which fragments become detached only slowly during the usual procedures of handling, e. g. transferring, agitating or storing. As a consequence of this growth habit only a relatively small increase in the actual number of seed units is obtained by preparing the seed culture, the principal result being merely an increase in the size of the individual growing unit. For this and other reasons it has heretofore been difficult to produce sufficient seed of filamentous organisms with which to inoculate the large volume of medium required for the commercial utilization of these organisms.

It is apparent that any improvement in the method for growing filamentous organisms, and particularly penicillin - producing organisms, which will lead to a simpler method for preparing the seed used in inoculating the medium in which the organisms is to be grown on a large scale will be of value.

It is therefore an object of the present invention to provide a method for the production of seed cultures of filamentous organisms. An additional object is to provide a method for producing seed cultures of filamentous organisms whereby the volume thereof necessary to seed adequately a particular volume of medium may be reduced greatly over that required in conventional seeding operations. An additional object is to provide a method for treating a seed culture of a filamentous organism whereby the amount of medium which may be seeded with it may be increased greatly. Still another object is to provide a process for producing penicillin wherein the preparation of a large volume of seed culture is avoided. A further object is to provide a method for producing a seed culture of a filamentous penicillin-producing organism.

These and related objects are accomplished readily by agitating the mixture of medium and growing organism which is to be used for seeding purposes sufficiently to effect a substantial fragmentation of the filaments of the organism into separate units containing a much smaller number of individual cells than do the unfragmented filaments. During this procedure the soft pellets or clumps of the individual growing colonies of the organism are broken up and the fragments dispersed and also the individual filaments, which it is not possible to break up appreciably by ordinary shaking or other conventional stirring operation, are fragmented so as to form a multitude of independent suspended particles, each of which consists of a relatively small number of growing cells and each of which is capable, when introduced into fresh medium, of growing into a vigorous colony. Not only is the amount of organism required for seeding purposes reduced greatly by the method of the invention, but the yield of desired product based on the amount of seed used is increased tremendously. Furthermore, the time, effort, and expensive equipment required for producing adequate quantities of seed of filamentous organisms by the new method is only a very small fraction of that necessary for the production of such seed by hitherto known methods.

Although the invention will be described with particular reference to the production of penicillin by *Penicillium notatum*, *Penicillium chrysogenum* or by other members of the *Penicillium chrysogenum* series, it is applicable, as well, to any process wherein it is desirable to seed a body of a fluid medium with a filamentous organism. Organisms of the filamentous type include in addition to those of the *Penicillium chrysogenum* series, *Actinomyces lavendulae*, and *Actinomyces griseus*, which are useful in the preparation of such important substances as streptothrycin and streptomycin, respectively.

Although fragmentation of the growing filamentous organism, conveniently referred to here as a blending operation, may be accomplished in any convenient manner, it is accomplished easily and without difficulty by agitating the fluid mixture of medium and organism with a high-speed mixer. A stirrer fitted with an agitator blade which exerts a shearing action is preferable, but is not essential. Due to the small volume of fluid containing the fragmented filaments needed to inoculate even the largest of vessels used commercially in growing filamentous organisms, only a small agitator and container are required. Actually, in practice a Waring Blendor (manufactured by the Waring Corporation) holding about one quart has been found very satisfactory. Any other suitable equipment may, of course, be used.

The degree of fragmentation of the Penicillium organism effected may be varied over a wide range since it appears that, up to a certain point, the greater the degree of fragmentation effected the smaller the proportion of seed culture necessary to provide optimum inoculation of the medium in which the organism is to be grown for the production of penicillin. If desired, a moderate degree of fragmentation may be effected and a larger proportion of the blended mixture used than would be required if a greater degree of fragmentation had been effected. It appears, further, that once a certain degree of fragmentation is effected, as measured by the time of agitating the fluid under standardized conditions, no advantage is to be gained by further continuation of the blending operation. Generally speaking, it is preferable to continue the blending operation until the optimum degree of fragmentation has been attained. Continuance of the blending operation longer than is necessary may lead to heating the fluid unduly by friction developed during the agitation. In any case, the temperature should be maintained within the known limits of safety to the organism.

It has been found advisable, in carrying out the invention, to select a suitable apparatus for effecting the fragmentation and to then blend a series of duplicate samples of a seed culture representative of that which it is desired to use, the blending operation being continued for a different length of time with each sample. Portions of each of the blended samples are then used to inoculate a series of duplicate portions of the medium which it is desired to use commercially. The inoculated portions of medium are incubated under standardized growth promoting conditions for varying periods of time and then assayed to determine the concentration of the desired product in the incubated portion. From these determinations it is easy to formulate conditions of time and agitator speed for any particular apparatus which will produce a blended seed culture which has an optimum degree of fragmentation and to determine the proportion thereof which should be used in subsequent seeding operations to produce the optimum concentration of product in the shortest time. Further blending operations are then always carried out in the same apparatus and under the standardized conditions selected. The blended seed culture of the invention is of value in the inoculation of medium for the growth of filamentous organisms by both surface and submerged culture.

When carried out as directed, the blending operation, using *Penicillium notatum*, may decrease the ratio of volume of seed culture to the volume of medium which may be inoculated properly therewith for submerged culture from about 1:10 or 1:30 to as little as 1:100,000 or even, in some instances, 1:500,000. A penicillin content is attained readily in the seeded medium at least as high as, and usually higher, than that possible when using unblended seed. In the case of surface culture the proportion of blended seed used may be as low as one hundredth part or less of that of unblended seed required.

Certain advantages of the invention may be seen from the following examples which are given solely by way of illustration and are not to be construed as limiting.

*Example 1*

An agar slant in a 2-liter flask was inoculated with spores of a pure culture of *Penicillium notatum* (NRRL strain No. 832) incubated at 70° F. for one week, and washed with water to recover the spores. The washings were strained through a cloth to remove large suspended particles, the spores concentrated by centrifuging and then resuspended and diluted to a volume of about 0.5 liter. The suspension contained about $2 \times (10)^9$ spores per milliliter.

One-tenth milliliter portions of the spore suspension were added to separate 250 milliliter portions of a growth-promoting medium in 2-liter shaker flasks and the mixtures shaken at 70° F. for about six days. One of the mixtures was then placed in the jar of a Waring Blendor and agitated for 0.5 minute with the agitator running at a speed of about 10,000 R. P. M. The blended mixture and one unblended mixture were used in carrying out the following determinations.

Two series of a number of 100 milliliter portions of fresh medium were autoclaved. The portions in one of the series were inoculated with different volumes of the unblended culture and the maximum penicillin content which developed in the medium noted. Penicillin content was determined by a modification of the Agar cupplate method described in Circular 198 of the United States Department of Agriculture.

In like manner the second series of autoclaved portions of medium were inoculated with the 0.5 minute blend and the same determination made. In the accompanying table there are listed for each series the average maximum penicillin concentration expressed in Oxford units per milliliter, developed in the medium and the smallest ratio of volume of inoculum to volume of medium required to produce such maximum concentration.

Table

| Inoculum | Ratio | Average Maximum penicillin level |
|---|---|---|
| 0.5 minute blend | 1:100,000 | 106 |
| Unblended | 1:10 | 60-75 |

Similar results were obtained using *Penicillium chrysogenum* (NRRL strain No. 1951)

Example 2

In a representative small-scale commercial preparation of penicillin 500 milliliters of a spore suspension of *Penicillium notatum* (NRRL strain No. 832) prepared as described in paragraph 1 of Example 1 was added to 5 liters of fresh medium and the mixture stirred slowly for 48 hours at 70° F. The 5 liters of seed culture was then added to 160 liters of fresh medium in a vessel equipped for stirring and the organism allowed to grow for 96 hours at 70-72° F. The mixture then had a penicillin content of about 80 Oxford units per milliliter. Any substantial reduction in either the ratio of volume of spore suspension to volume of seed culture medium or of the ratio of the volume of seed culture to volume of final growth medium led invariably to a lowered penicillin content in the final fermented mixture.

In a similar production schedule the 160 liters of medium was seeded with 1.6 milliliters of a blended seed culture prepared and blended for 2.0 minutes as described in paragraphs 1 and 2 of Example 1. After growing for 96 hours at 70-72° F. the mixture had a penicillin content of 80 Oxford units per milliliter.

Similar results were obtained using *Penicillium chrysogenum* (NRRL strain No. 1951).

We claim:

In the production of a seed culture, the steps which include: adding a spore suspension of a member of the *Penicillium-notatum-chrysogenum* group to a fluid growth-promoting medium; shaking the mixture at about 70° F. to culture the same; and blending the fluid mixture by high speed agitation to effect fragmentation of the filaments of the microorganism.

MILTON J. VANDER BROOK.
GEORGE M. SAVAGE.

REFERENCES CITED

The following references are of record in the file of this patent:

UNITED STATES PATENTS

| Number | Name | Date |
|---|---|---|
| 1,054,324 | Takamine | Feb. 25, 1913 |
| 1,893,819 | Currie et al. | Jan. 10, 1933 |
| 1,908,225 | Currie et al. | May 9, 1933 |
| 2,121,533 | Wells | June 21, 1938 |
| 2,325,368 | Christensen | July 27, 1943 |
| 2,326,986 | Waksman et al. | Aug. 17, 1943 |
| 2,352,168 | Christensen et al. | June 27, 1944 |

OTHER REFERENCES

Waksman et al., Jr. Bacteriology, vol. 46, 1943, page 340.

Waksman, ibid, vol. 39, 1940, pages 549 and 553.